Sept. 29, 1931.  R. WEBER  1,825,219
CHUCK
Filed July 31, 1928
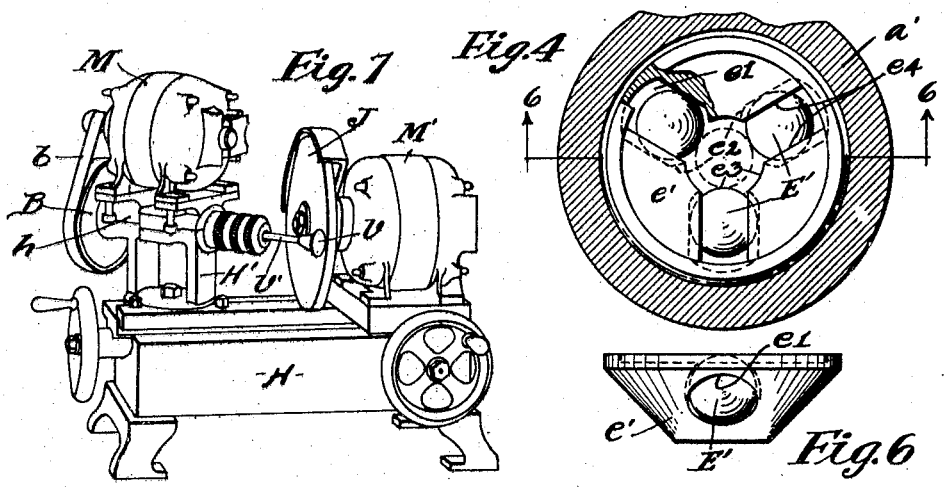
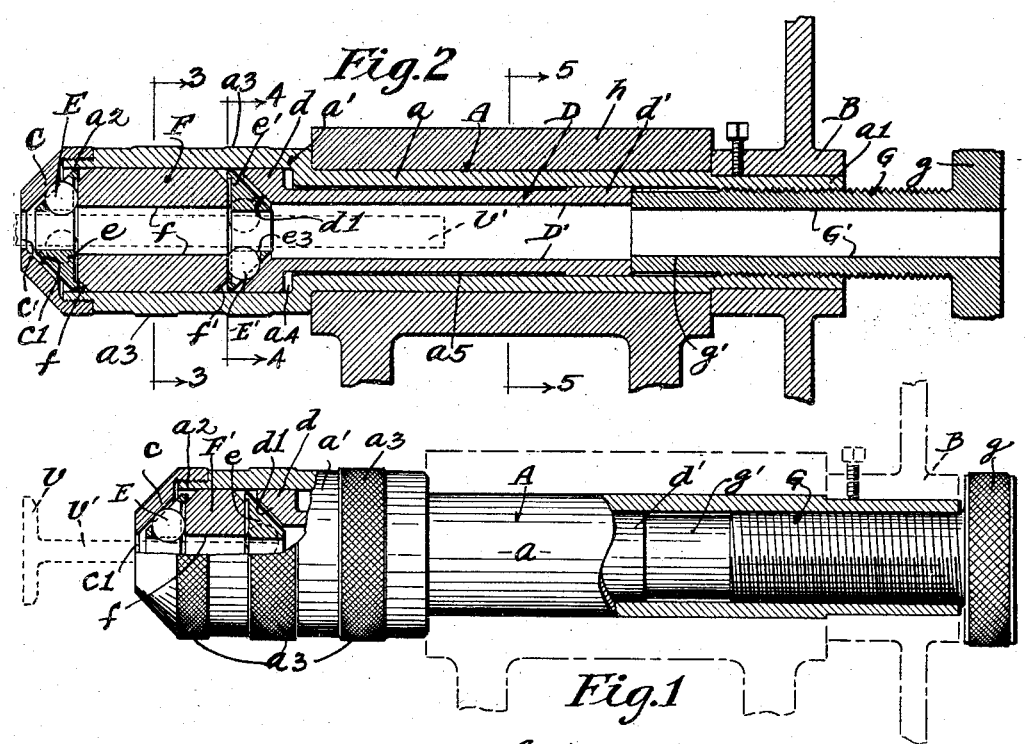
INVENTOR.
Robert Weber,
BY
ATTORNEYS.

Patented Sept. 29, 1931

1,825,219

UNITED STATES PATENT OFFICE

ROBERT WEBER, OF LOS ANGELES, CALIFORNIA

CHUCK

Application filed July 31, 1928. Serial No. 296,564.

This invention relates to and has for a principal object the provision of an improved type of chuck, arranged for use on machine tools, and particularly adapted for chucking poppet valves of internal combustion engines.

An object is to provide an improved type of chuck readily adjustable for frictionally holding the work in positive axial alinement with and on a spindle.

A more detailed object of invention is to provide a chuck including a rotatable spindle with a pair of substantially spaced ball gripping devices and co-operating cones with a spacer or spacers therebetween, together with means for moving said elements longitudinally, whereby the gripping devices will contact with the cones and be adjusted radially with respect to the axis of the spindle into and from contact with the work.

In the consideration of this invention it may be understood that I am aware that ball gripping devices have been used in other types of chucks, but I have provided an improved type of chuck embodying such devices with means whereby a more positive if not actual alinement may be effected between the work and the spindle, so that the work will rotate true with the spindle when operated at high speeds.

Such a device is particularly valuable for use in connection with grinding machines whereby the angular faces of internal combustion engine valves are ground.

Another object of invention is to provide a chuck of the character mentioned which may be operated for quickly attaching and detaching the work.

Still other objects may appear as the description progresses.

In the accompanying drawings I have shown a preferred form of invention, in which Fig. 1 is an external view of a complete assembled chuck partly in section.

Fig. 2 is a longitudinal section of the same showing a substantially elongated spacer between the gripping devices.

Fig. 3 is a transverse section of the same on line 3—3 of Fig. 2.

Fig. 4 is a transverse section of the same on line 4—4 of Fig. 2.

Fig. 5 is a transverse section of the same on line 5—5 of Fig. 2.

Fig. 6 is an edge view of one of the ball retainers as seen on line 6—6 of Fig. 4.

Fig. 7 is a perspective view of the valve grinding machine to which my improved chuck may be applied for use.

Briefly described, my chuck includes a spindle A adapted to be rotated by a suitable pulley B or otherwise and provided with a detachable cone C on its opposite end from the pulley B. Internal of the spindle I provided an elongated sleeve D, a variable spacer F and a pair of gripping devices E and E', together with a locking screw G.

The spindle A has a stem $a$ which is adapted to be rotatably held in a bearing, as at $h$, and is provided with a reduced end portion $a1$ adapted to receive the driving pulley B. At its other end the spindle has an enlarged cylindrical portion $a'$ with an externally threaded reduced portion $a2$ adapted to receive a correspondingly internally threaded portion of the cone C. Rearwardly of said cone the portion $a'$ is knurled at one or more points $a3$ for providing a hand grip whereby the chuck may be adjusted for gripping a valve stem or any other piece of work adapted to be held therein. The head $a'$ of the chuck is bored at $a4$ to slidably receive a head $d$ formed on the sleeve D. Said sleeve is provided at its rear end with a portion $d'$ which slidably engages the bore $a5$ of the spindle A.

The end portion $a1$ of said spindle is internally threaded to receive the stem of the locking screw G, and said screw is provided with a knurled head $g$ and has its inner end $g'$ slightly reduced in diameter and arranged for abutting engagement with the adjacent end $d'$ of the sleeve D.

The ball gripping devices E and E' are mounted adjacent the cones C and $d$ respectively, and the variable spacer F is mounted between said gripping devices and has its ends arranged for frictional engagement with the balls thereof.

The members F, D and G have alined bores $f$, D' and G' respectively, so arranged that a valve stem, as at V', may be inserted and held in the chuck. The cone C also has a central aperture C' therein through which the valve stem V', or any other piece of work, may be inserted in the chuck. The member C has an internal cone C1 which is formed at an angle of approximately 60° from the adjacent end of the spacer F, while the portion $d$ of sleeve D is provided with a similar cone $d1$ of the same angularity and disposition with respect to the adjacent end of said member F.

Preferably the edges of the spacer F are beveled, as at $f'$, so as to provide clearance between the spacer and the cones for the reception of the retainers $e$ and $e'$ of the gripping devices. The balls E and E' of the gripping devices are adjustably held in their respective retainers $e$ and $e'$ by means of bores $e1$ in which the balls loosely fit. Said bores have their inner extremities $e2$ beveled so that the openings of the bores into the central bore $e3$ of the retainers will be of substantially less diameter than the balls. The bores $e1$ are also open, as at $e4$, adjacent the ends of the spacer F. The head $a'$ of the chuck is adapted to abut the end of the bearing $h$.

A chuck of the character shown and described is particularly adapted for supporting a poppet valve, as at V, so that the stem V' thereof may be inserted in the chuck and firmly gripped by the balls E and E' for rotation with the spindle.

A form of machine in connection with which my chuck may be used is shown in Fig. 7. Such a machine embodies a suitable base H with a frame H' thereon, carrying the bearing $h$ in which the spindle A is rotatably mounted.

The pulley B is adapted to be operated by means of a belt $b$ from the spindle of a motor M. In such a grinding machine the grinder J is rotatably mounted on the spindle of a motor M' which is suitably adjusted longitudinally of the base H for engagement with the valve V, which is supported in the chuck.

In this connection it will be noted that in Fig. 1 I have shown a substantially shorter spacer F' than the spacer F shown in Fig. 2 for indicating the variability of the chuck to accommodate itself to work of different kinds and for different purposes.

In operation and use the spindle A of the chuck is mounted in the bearing $h$, while the driving pulley B is attached thereto by suitable means for rotating the chuck in the bearing. The chuck is opened for the reception of the valve stem V', or any other piece of work, by unscrewing the locking screw G and retracting the same from engagement with the portion $d'$ of the spindle. Thus, the work may be inserted through the opening C' of the cone C between the balls E of the first gripping device, thence through the bore $f$ of the spacer F, thence through the gripping device E' and the bore D' of the sleeve. The chuck may be then tightened and the work firmly gripped by the balls E and E' by screwing the locking member G inwardly into frictional engagement with the inner end of the sleeve D.

The inward movement of the locking screw G affects a reciprocable movement of the sleeve D, the gripping devices E and E', and the spacer F, in the direction of the outer cone C and the ensuing movement of the balls E and E' radially in the direction of the axis of the work. Such movement of the balls E and E' radially in the direction of the axis of the work is effected by contact of the balls with the cones C1 and $d1$ and with the ends of the spacer F. It is obvious that when the head $a'$ of the chuck is gripped by one hand and held against rotation and the head $g$ of the locking screw G is gripped by the other hand, the locking screw may be moved relative to the spindle and chuck for the purpose of locking and unlocking the work in the chuck.

My improved device is especially valuable for the reason that the cones, being identical, may be ground to size in a single set up and the gripping devices, being substantially spaced apart, firmly grip and support the work at spaced points so that substantially no variation in the set up of the work is possible, and extreme accuracy is provided in the grinding of a valve or other tools.

It will be apparent to those skilled in the art that I have provided an economical, efficient and practical form of chuck capable of diversified use where accuracy and fine workmanship are required.

What I claim is:

A chuck comprising a hollow spindle formed with a head, a detachable end piece on said head formed with an integral cone located in said spindle head, a sleeve longitudinally adjustable in said spindle head and formed with an internal cone located in said spindle head, floating ball retainers in said spindle head adjacent said internal cones respectively, balls radially adjustable in said retainers for engagement with said internal cones, a spacer mounted in said head and formed with flat end faces for engagement with said ball retainers respectively, and a locking member screw-seated in said hollow spindle for engaging the end of the shank of said sleeve and longitudinally adjusting said sleeve, to cause said internal cones to force said balls inwardly to grip the work in the chuck.

ROBERT WEBER.